(12) United States Patent
Madhu et al.

(10) Patent No.: US 11,072,263 B2
(45) Date of Patent: Jul. 27, 2021

(54) VEHICLE SEATING SYSTEM

(71) Applicant: LEAR CORPORATION, Southfield, MI (US)

(72) Inventors: Adarsha B. Madhu, Novi, MI (US); Stephen Douglas Redwood, Flat Rock, MI (US)

(73) Assignee: Lear Corporation, Southfield, MI (US)

( * ) Notice: Subject to any disclaimer, the term of this patent is extended or adjusted under 35 U.S.C. 154(b) by 2 days.

(21) Appl. No.: 16/550,693

(22) Filed: Aug. 26, 2019

(65) Prior Publication Data

US 2021/0061144 A1   Mar. 4, 2021

(51) Int. Cl.
*B60N 2/30* (2006.01)
*B60N 2/90* (2018.01)

(52) U.S. Cl.
CPC .......... *B60N 2/3047* (2013.01); *B60N 2/938* (2018.02); *B60N 2002/952* (2018.02)

(58) Field of Classification Search
CPC ...... B60N 2/3047; B60N 2/305; B60N 2/938; B60N 2002/952
See application file for complete search history.

(56) References Cited

U.S. PATENT DOCUMENTS

| | | | |
|---|---|---|---|
| 4,793,649 A | * | 12/1988 | Yamano |
| 6,481,799 B1 | * | 11/2002 | Whalen |
| 6,767,061 B2 | * | 7/2004 | Ogino |
| 7,780,234 B2 | | 8/2010 | Grable et al. |
| 8,376,442 B1 | | 2/2013 | Brantley |
| 8,752,898 B2 | * | 6/2014 | Gleason |
| 9,073,457 B2 | * | 7/2015 | Muller |
| 9,352,672 B2 | * | 5/2016 | Elton |
| 9,440,564 B2 | * | 9/2016 | Crossley |
| 9,868,367 B2 | | 1/2018 | Doxey et al. |
| 10,618,436 B2 | * | 4/2020 | Madhu |
| 2004/0036339 A1 | * | 2/2004 | Christoffel |
| 2008/0122281 A1 | * | 5/2008 | Weber |
| 2009/0108657 A1 | * | 4/2009 | Becker |
| 2010/0141007 A1 | * | 6/2010 | Kienke |
| 2019/0077330 A1 | * | 3/2019 | Mihcalak |

FOREIGN PATENT DOCUMENTS

DE   10348293 A1   5/2005

OTHER PUBLICATIONS

Office Action dated Jun. 10, 2021 re German App. No. 102020210015.

* cited by examiner

*Primary Examiner* — Philip F Gabler
(74) *Attorney, Agent, or Firm* — Brooks Kushman P.C.

(57) ABSTRACT

A seating system for a vehicle includes a seat back and a seat bottom selectively rotatable between a design position and a stowed position. A latch arrangement has a first cam with first and second surfaces, a support structure with first and second surfaces, and a second cam. The latch arrangement has a first locking position wherein the first surface of the first cam engages the first surface of the support structure so that movement of the seat bottom from the design position to the stowed position is inhibited. The latch arrangement also has a second locking position wherein the second cam engages a portion of the support structure so that movement of the seat bottom from the stowed position to the design position is inhibited.

19 Claims, 4 Drawing Sheets

VEHICLE SEATING SYSTEM

TECHNICAL FIELD

The present disclosure relates to a seating system for a vehicle.

BACKGROUND

Seating systems in vehicles may be constructed to be arranged in a number of different configurations. For example, a design position may be one in which the seat back and seat bottom are positioned relative to each other to receive a vehicle occupant. A fold-forward position may be one in which the seat back is folded forward on top of the seat bottom to provide a flat surface for storage. Other configurations are also used, including ones in which the entire seat slides forward to allow entry to a row of seats behind, and ones in which the seat bottom may be folded up to be generally vertical. This latter position may sometimes be referred to as a "stadium position".

SUMMARY

Embodiments described herein may include a seating system for a vehicle that includes a seat back and a seat bottom selectively rotatable between a design position and a stowed position. A latch arrangement may include a first cam having first and second surfaces, a support structure having first and second surfaces, and a second cam. The latch arrangement may have a first locking position wherein the first surface of the first cam engages the first surface of the support structure such that movement of the seat bottom from the design position to the stowed position is inhibited. The latch arrangement may also have a second locking position wherein the second cam engages a portion of the support structure such that movement of the seat bottom from the stowed position to the design position is inhibited.

Embodiments described herein may include a seating system for a vehicle that includes a seat back and a seat bottom selectively rotatable between a design position and a stowed position. A latch arrangement may include a first cam having a latch hook, and a support structure having a blocking surface and a notch configured to capture the latch hook therein and inhibit rotation of the seat bottom from the design position to the stowed position when the latch arrangement is in a first locking position. The latch arrangement may further include a second cam having a blocking surface configured to contact the blocking surface of the support structure when the latch arrangement is in a second locking position such that movement of the seat bottom from the stowed position to the design position is inhibited.

Embodiments described herein may include a seating system for a vehicle that includes a seat back and a seat bottom selectively rotatable between a design position and a stowed position. A latch arrangement may include a first locking position in which the seat bottom is locked in the design position, a second locking position in which the seat bottom is locked in the stowed position, and a released position in which the seat bottom is movable between the design position and the stowed position. The latch arrangement may include a first cam having a first surface, a second cam having a blocking surface, and a support structure having a first surface and a blocking surface. The first surface of the first cam may be positioned to engage the first surface of the support structure to inhibit movement of the seat bottom from the design position to the stowed position when the latch arrangement is in the first locking position. The blocking surface of the second cam may be positioned to engage the blocking surface of the support structure to inhibit movement of the seat bottom from the stowed position to the design position when the latch arrangement is in the second locking position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
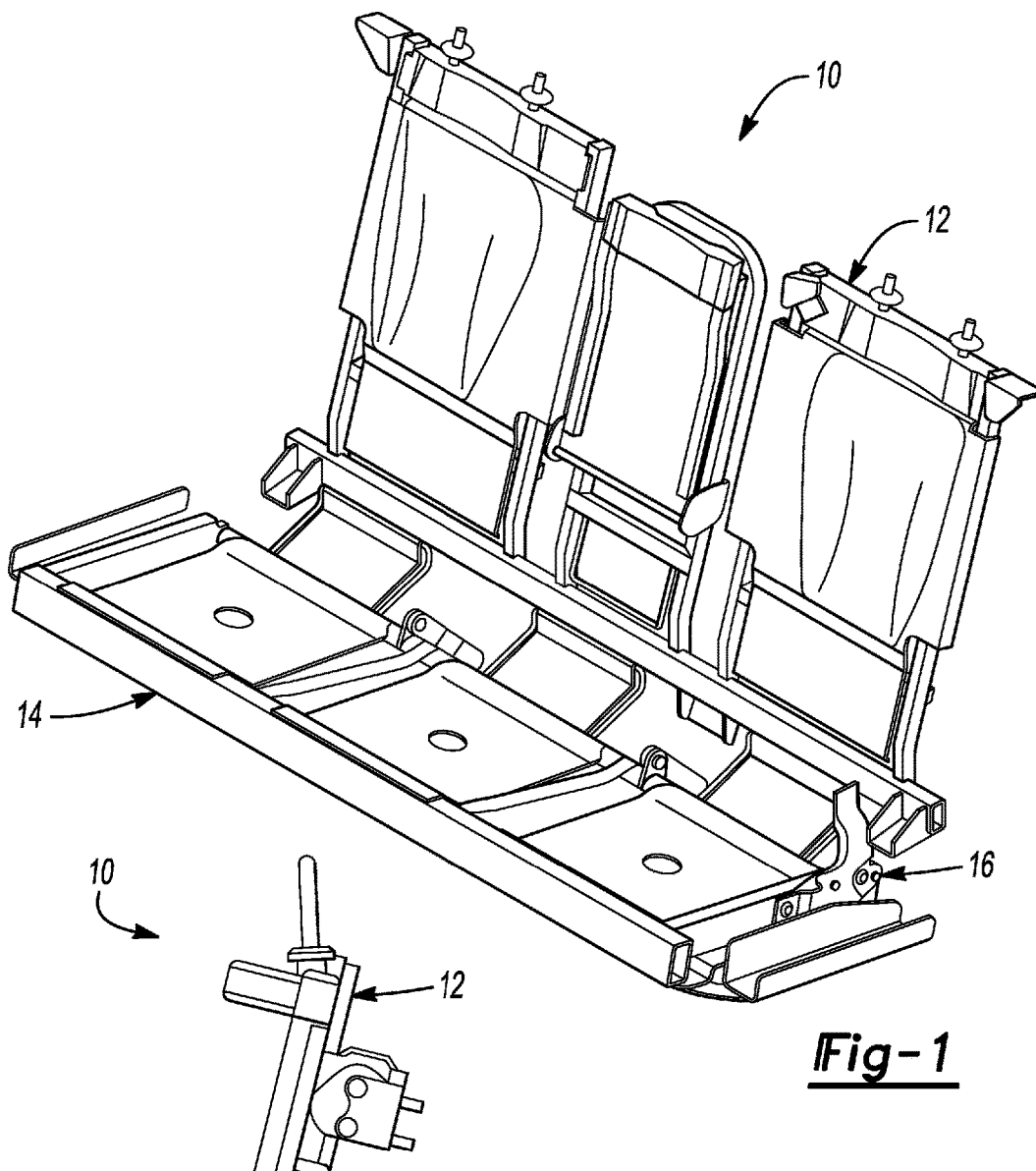
FIG. 1 shows a perspective view of a seating system for vehicle in accordance with embodiments described herein.
Figure 2:
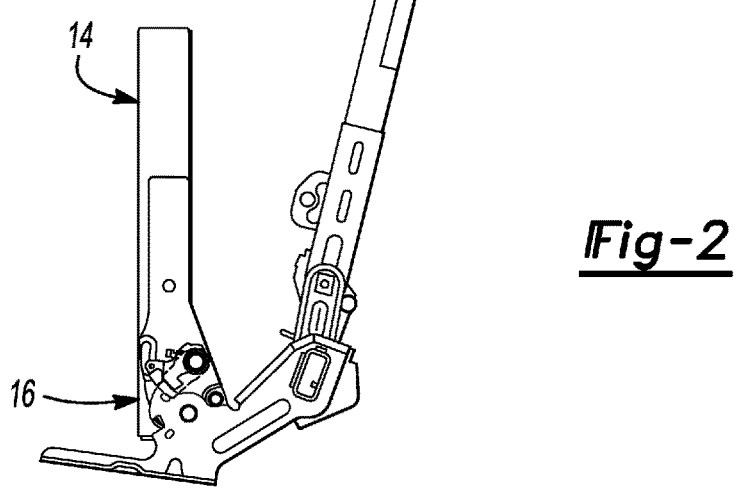
FIG. 2 shows a side view of the seating system with a seat bottom in a stowed position.

FIG. 1 shows a seating system 10 for a vehicle. The seating system 10 is a bench seat with a 40-20-40 split. The seating system 10 includes a seat back 12 and a seat bottom 14, each of which is split to separately accommodate the three seating sections of the bench seat. As shown in FIGS. 1 and 2, the seat bottom 14 is attached to and selectively rotatable between a design position and a stowed position—shown in FIG. 1 and FIG. 2, respectively. In other embodiments, a seat bottom may not be attached to a seat back, but may be mounted to a floor or other frame structure of the vehicle, while the seat back is independently mounted to the floor or other frame structure of the vehicle.

As shown in FIGS. 1 and 2, the design position is when the seat bottom 14 is generally horizontal and is in a position to accept a seated occupant, and the stowed position is when the seat bottom 14 is generally vertical and is not in position to accept a seated occupant. The stowed position shown in FIG. 2 of the seat bottom 14 is sometimes called a "stadium position". Also shown in the drawing figures is that the seating system 10 includes a latch arrangement 16, which is configured to selectively inhibit or facilitate movement of the seat bottom 14 between the design and stowed positions.

Figure 3:
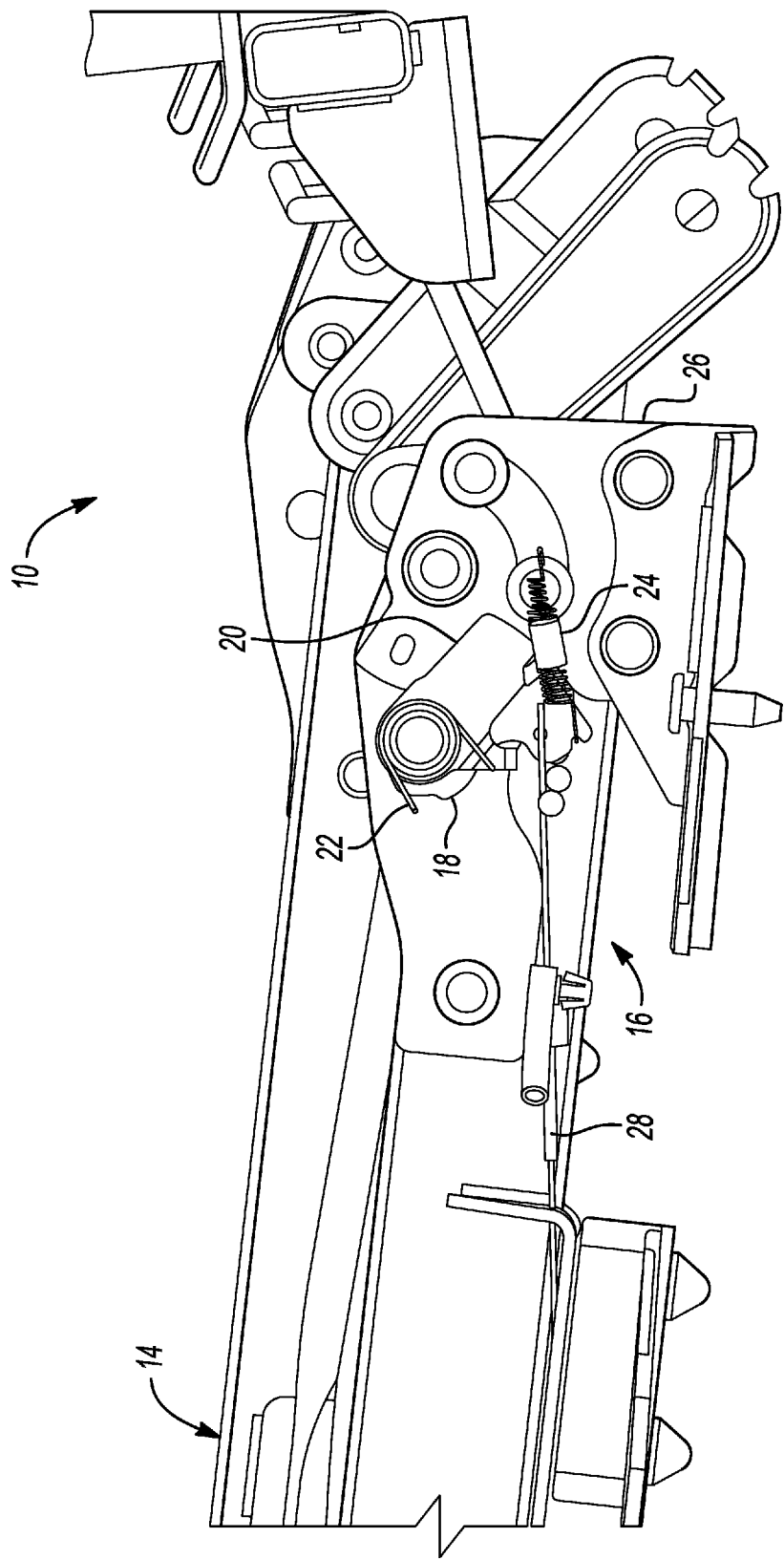
FIG. 3 shows a latch arrangement in accordance with embodiments described herein.

FIG. 3 shows seating system 10, and in particular, the latch arrangement 16 in more detail. The latch arrangement 16 includes a first cam, or blocker cam 18. It also includes a second cam, or cinch cam 20. As shown in FIG. 3, a torsion spring 22 imparts a torque to the cinch cam 20 such that it applies a force and an associated torque to the blocker cam 18. The applied torque is in a counterclockwise direction as oriented in FIG. 3. A tension spring 24 is attached to between the blocker cam 18 and a portion of a seat frame 26. An actuator includes a cable 28, which is attached to the blocker cam 18, and as described in more detail below, is operable to release the latch mechanism from a locking position to a released, or unlocked position.

In general, an actuator, such as part of a latch arrangement in accordance with embodiments described herein, may be operable to move at least one of a cam or support structure between engaged and disengaged positions. As applied to the embodiments illustrated herein, a first of the engaged positions may correspond to the first locking position of the latch arrangement 16—see FIG. 4, a second of the engaged positions may correspond to the second locking position of the latch arrangement 16—see FIG. 6, and the disengaged position may correspond to the unlocked position of the latch arrangement 16—see FIG. 5. The cable 28 may be attached to a manually-operated lever or button forming a part of the actuator and which can be operated to apply a tension to the cable 28 to move the blocker cam 18 against the action of the springs 22, 24. Other actuators may also be used, including automatic or motor-driven actuators and those that do not use cables.

Figure 4:
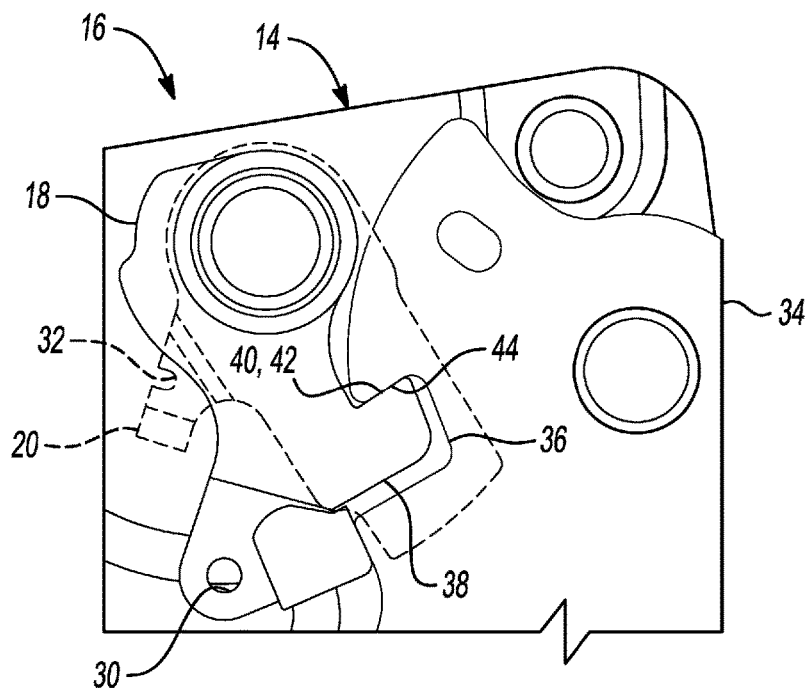
FIG. 4 shows the latch arrangement shown in a first locking position.

FIG. 4 shows the latch arrangement 16 with several seat components removed for clarity. As shown in FIG. 4, the blocker cam 18 includes an aperture 30, which provides an attachment point for the cable 28. Similarly, the cinch cam 20 includes an attachment point 32 where the torsion spring 22 is attached. In FIG. 4, the cinch cam 20 is shown in phantom so that the shape of the blocker cam 18 is visible. Also shown in FIG. 4 is a support structure, which in this embodiment, is a fixed sector 34. In other embodiments, the support structure may be a portion of the seat frame or some other bracket or frame structure. In addition, a support structure in other embodiments may be movable relative to other elements of the latch arrangement 16, rather than being fixed as shown in FIG. 4. The fixed sector 34 includes a notch 36, which is configured to receive a latch hook 38 of the blocker cam 18. The blocker cam 18 includes a first surface 40 disposed along a first edge 42 of the latch hook 38. The fixed sector 34 includes a first surface 44, which is positioned inside the notch 36.

Figure 5:
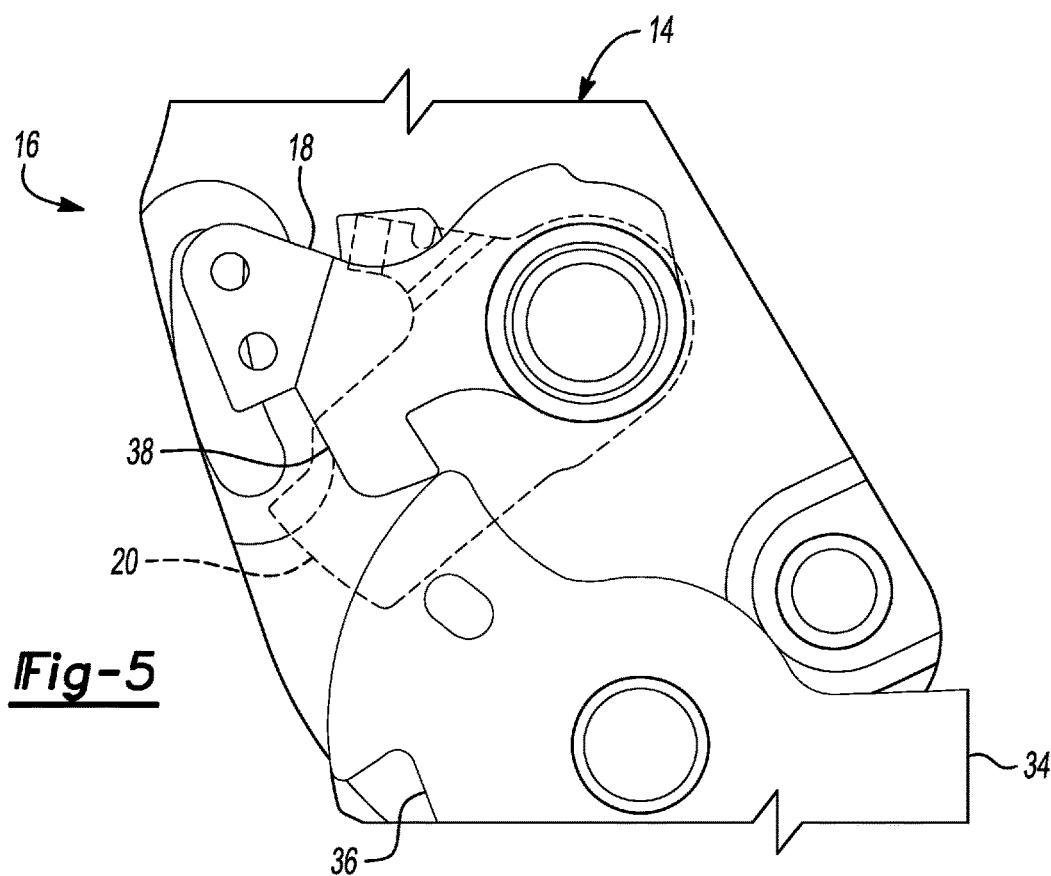
FIG. 5 shows the latch arrangement in a released position.

The notch 36 is configured to receive the latch hook 38 therein when the latch arrangement 16 is in the first locking position as shown in FIG. 4. In this position, the seat bottom 14 is in the design position and its movement to the stowed position is inhibited because the first surface 40 of the blocker cam 18 engages with the first surface 44 of the fixed sector 34. In the embodiment shown in FIG. 4, in order to release the latch arrangement 16 to facilitate movement of the seat bottom 14 from the design to the stowed position, the actuator is operated to tension the cable 28 and rotate the blocker cam 18 clockwise as shown in FIG. 4. In other embodiments, a separate actuator may not be used; rather, the blocker cam 18 and the fixed sector 34 may be configured to interface with each other such that the seat bottom 14 may be rotated from the design position to the stowed position merely by lifting along the front edge of the seat bottom 14 with at least a predetermined force. FIG. 5 shows the latch arrangement 16 in the released or unlocked position wherein the latch hook 38 is positioned outside the notch 36 and the seat bottom 14 is between the design and stowed positions. As shown in a comparison between the positions of the latch arrangement 16 in FIGS. 4 and 5, the blocker cam 18 and the cinch cam 20 are attached to and rotate with the seat bottom 14, whereas the fixed sector 34 is fixed relative to the seat bottom 14.

Figure 6:
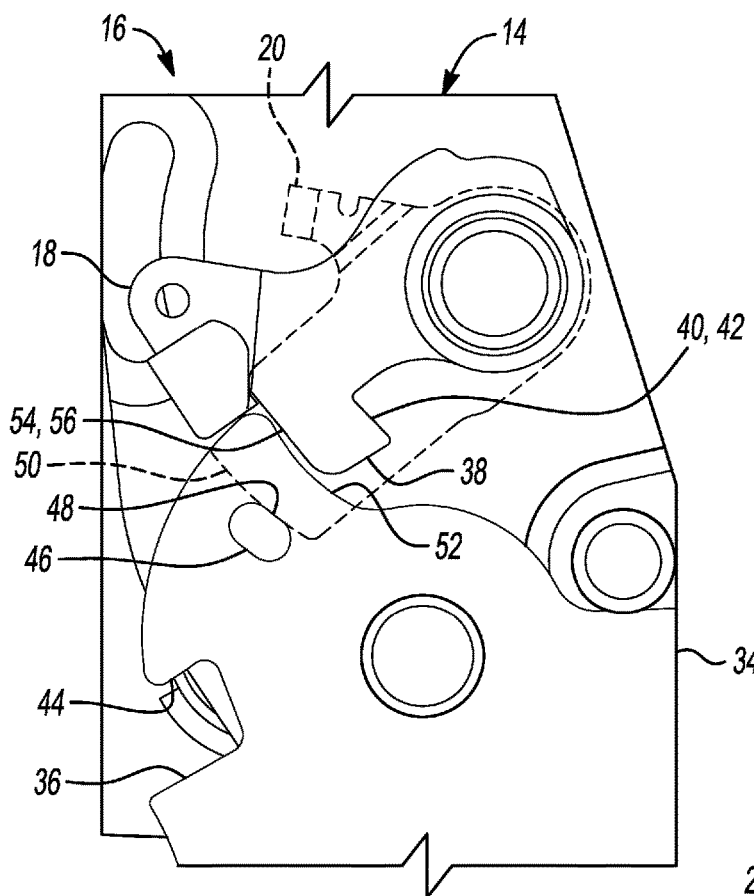
FIG. 6 shows the latch arrangement in a second locking position.

FIG. 6 shows the seat bottom 14 in the stowed or stadium position. In this position, the latch mechanism 16 is in a second locking position. When the latch mechanism 16 is in the second locking position, the cinch cam 20 engages a portion 46 of the fixed sector 34 such that movement of the seat bottom 14 from the stowed position to the design position is inhibited. In the embodiment shown in FIG. 6, the portion 46 of the fixed sector that engages the cinch cam 20 is a convex element stamped into the fixed sector 34, commonly referred to as a "semi-pierce". In other embodiments, the fixed sector 34 may be configured with a different feature—or even a separate piece attached to it—to provide a surface for engaging the cinch cam 20. The semi-pierce 46 includes a blocking surface 48 that contacts a blocking surface 50 of the cinch cam 20 in the second locking position to maintain the seat bottom 14 in the stowed position. In the embodiment shown in FIG. 6, the blocking surface 48 of the fixed sector 34 is outside of the notch 36; in other words, different surfaces of the fixed sector 34 are engaged to maintain the latch mechanism 16 in the first and second locking positions.

As described above, the cinch cam 20 and its interaction with the semi-pierce 46 inhibits movement of the seat bottom 14 from the stowed position to the design position. In the presence of a very large force, however, the cinch cam 20 may be moved out of contact with the semi-pierce 46, in which case, without additional structure, the seat bottom 14 may undesirably return to the design position. In the embodiment shown in FIGS. 6 and 7, however, such an undesirable movement of the seat bottom 14 will not occur. This results from the position of the latch hook 38 relative to the fixed sector 34. More particularly, the fixed sector 34 includes a second surface 52 also positioned outside the notch 36. Similarly, the blocker cam 18 includes a second surface 54 disposed along a second edge 56 of the latch hook 38. In the embodiment shown in FIGS. 6 and 7, the second edge 56 of the latch hook 38 is positioned opposite the first edge 42. As shown in FIG. 6, the second surface 54 of the blocker cam 18 is positioned in a spaced relation adjacent to the second surface 52 of the fixed sector 34 when the seat bottom is in the stowed position.

Figure 7:
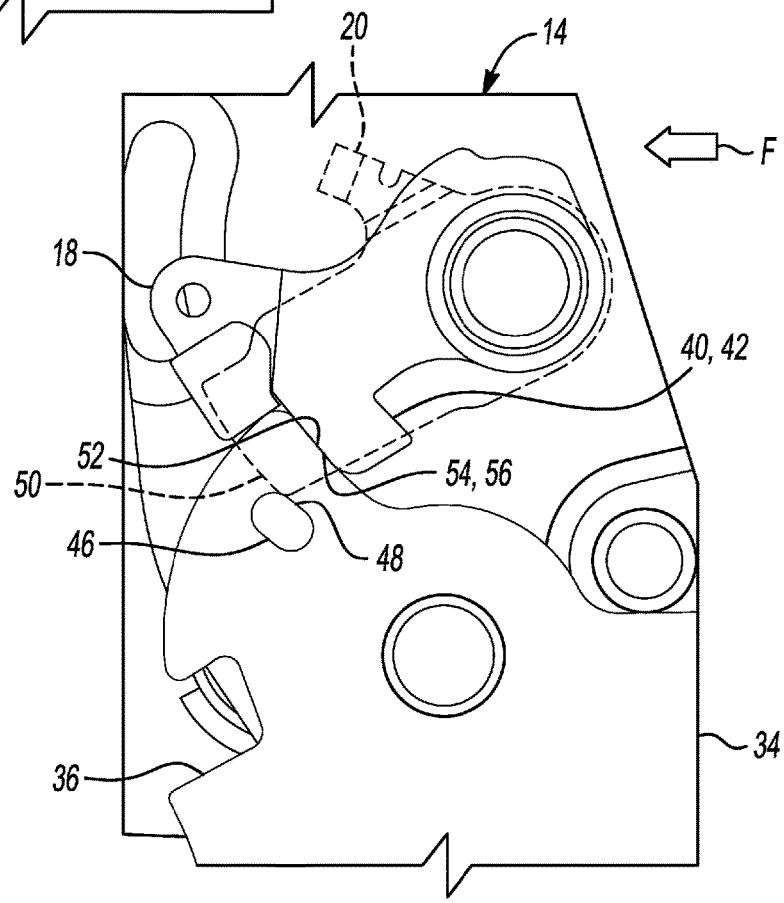
FIG. 7 shows the latch arrangement inhibiting movement of the seat bottom from the stowed position to the design position.

Application of a force of at least a predetermined magnitude in a direction tending to rotate the seat bottom 14 from the stowed position toward the design position may disengage the cinch cam 20 from the semi-pierce 46, and more particularly, the blocking surface 50 of the cinch cam 20 from the blocking surface 48 of the semi-pierce 46. This is shown in FIG. 7 where the predetermined force (F) may be a force, for example, of a magnitude seen during a frontal impact of the vehicle. As shown in FIG. 7, the blocking surface 50 of the cinch cam 20 has moved beyond the blocking surface 48 of the semi-pierce 46. This might otherwise allow the seat bottom 14 to be forced from the stowed position to the design position; however, the second surface 54 of the blocker cam 18 engages the second surface 52 of the fixed sector 34 to once again inhibit movement of the seat bottom 14 toward the design position. A number of factors may determine the level of force required to have the cinch cam 20 disengage from the semi-pierce 46, including the angles of contact of both elements, and the widths of the engaging surfaces 48, 50. Thus the design of these elements can be tuned to particular design requirements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle comprising:
   a seat back;
   a seat bottom selectively rotatable between a design position and a stowed position; and
   a latch arrangement including a first cam having first and second surfaces, a support structure having first and second surfaces, and a second cam separate from the first cam and rotatable relative to the first cam, the latch arrangement having a first locking position wherein the first surface of the first cam engages the first surface of the support structure such that movement of the seat bottom from the design position to the stowed position is inhibited, the latch arrangement further having a second locking position wherein the second cam engages a portion of the support structure such that movement of the seat bottom from the stowed position to the design position is inhibited.

2. The seating system of claim 1, wherein the second surface of the first cam is positioned adjacent to the second surface of the support structure when the seat bottom is in the stowed position, the latch arrangement being configured such that application of a force of at least a predetermined magnitude to rotate the seat bottom from the stowed position toward the design position disengages the second cam from the portion of the support structure and the second surface of the first cam engages the second surface of the support structure such that rotation of the seat bottom from the stowed position to the design position is inhibited.

3. The seating system of claim 1, wherein the latch arrangement further comprises an actuator operable to move at least one of the first cam or the support structure between engaged and disengaged positions, a first of the engaged positions corresponding to the first locking position of the latch arrangement, a second of the engaged positions corresponding to the second locking position of the latch arrangement, and the disengaged position corresponding to an unlocked position of the latch arrangement.

4. The seating system of claim 1, wherein the first cam includes a latch hook having the first surface of the first cam thereon and the support structure includes a notch having the first surface of the support structure therein, the notch being configured to receive the latch hook therein when the latch arrangement is in the first locking position.

5. The seating system of claim 4, wherein the second surface of the first cam is positioned on the latch hook opposite the first surface of the first cam, and the second surface of the support structure is positioned outside the notch.

6. The seating system of claim 5, wherein the portion of the support structure engaged by the second cam when the latch arrangement is in the second locking position does not include the second surface of the support structure.

7. The seating system of claim 1, wherein the first and second cams are attached to and rotate with the seat bottom and the support structure is fixed relative to the seat bottom.

8. A seating system for a vehicle comprising:
   a seat back;
   a seat bottom selectively rotatable between a design position and a stowed position; and
   a latch arrangement including a first cam having a latch hook, and a support structure having a blocking surface and a notch configured to capture the latch hook therein and inhibit rotation of the seat bottom from the design position to the stowed position when the latch arrangement is in a first locking position, the latch arrangement further including a second cam having a blocking surface configured to contact the blocking surface of the support structure when the latch arrangement is in a second locking position such that movement of the seat bottom from the stowed position to the design position is inhibited.

9. The seating system of claim 8, wherein the blocking surface of the support structure is outside the notch.

10. The seating system of claim 8, wherein the first cam includes a first surface disposed along a first edge of the latch hook and a second surface disposed along a second edge of the latch hook opposite the first edge, the support structure including a first surface positioned inside the notch and a second surface positioned outside the notch, the second surface of the first cam being positioned in a spaced relation adjacent to the second surface of the support structure when the seat bottom is in the stowed position.

11. The seating system of claim 10, wherein application of a force of at least a predetermined magnitude to rotate the seat bottom from the stowed position toward the design position disengages the blocking surface of the second cam from the blocking surface of the support structure, and the second surface of the first cam engages the second surface of the support structure such that rotation of the seat bottom from the stowed position to the design position is inhibited.

12. The seating system of claim 10, wherein the blocking surface of the support structure is disposed on a convex element positioned adjacent to the second surface of the support structure.

13. The seating system of claim 8, wherein the first and second cams are attached to and rotate with the seat bottom and the support structure is fixed relative to the seat bottom.

14. A seating system for a vehicle comprising:
    a seat back;
    a seat bottom selectively rotatable between a design position and a stowed position; and
    a latch arrangement having a first locking position in which the seat bottom is locked in the design position, a second locking position in which the seat bottom is locked in the stowed position, and a released position in which the seat bottom is movable between the design position and the stowed position, the latch arrangement including a first cam having a first surface and a second surface, a second cam having a blocking surface, and a support structure having a first surface, a second surface positioned adjacent to the second surface of the first cam when the seat bottom is in the stowed position, and a blocking surface, the first surface of the first cam being positioned to engage the first surface of the support structure to inhibit movement of the seat bottom from the design position to the stowed position when the latch arrangement is in the first locking position, and the blocking surface of the second cam being positioned to engage the blocking surface of the support structure to inhibit movement of the seat bottom from the stowed position to the design position when the latch arrangement is in the second locking position, and
    wherein the latch arrangement is configured such that application of a force of at least a predetermined magnitude to rotate the seat bottom from the stowed position toward the design position disengages the blocking surface of the second cam from the blocking surface of the support structure, and the second surface of the first cam engages the second surface of the support structure such that rotation of the seat bottom from the stowed position to the design position is inhibited.

15. The seating system of claim 14, wherein the blocking surface of the support structure is disposed on a convex element positioned adjacent to the second surface of the support structure.

16. The seating system of claim 14, wherein the latch arrangement further comprises an actuator operable to move at least one of the first cam or the support structure into and out of a first engaged position in which the first surface of the first cam is engaged with the first surface of the support structure and to move at least one of the second cam or the support structure into and out of a second engaged position in which the blocking surface of the second cam is engaged with the blocking surface of the support structure.

17. The seating system of claim 14, wherein the first cam includes a latch hook having a first edge and the support structure includes a notch having a first edge and configured to receive the latch hook therein when the latch arrangement is in the first locking position, the first edge of the latch hook being positioned to contact the first edge of the support structure inside the notch to inhibit rotation of the seat bottom from the design position to the stowed position when the latch arrangement is in the first locking position.

18. The seating system of claim 17, wherein the latch hook includes a second edge and the support structure includes a second edge positioned outside the notch, the second edge of the latch hook being positioned to contact the second edge of the support structure to inhibit rotation of the seat bottom from the stowed position to the design position when the latch arrangement is in the second locking position and a force of at least a predetermined magnitude is applied to the seat bottom to rotate the seat bottom from the stowed position toward the design position.

19. The seating system of claim 18, further comprising an actuator operable to move the latch hook out of the notch such that the first edge of the first cam does not contact the first edge of the notch when the seat bottom is rotated from the design position to the stowed position, the actuator being further operable to move the second cam such that the blocking surface of the second cam does not engage the blocking surface of the support structure when the seat bottom is rotated from the stowed position to the design position.

* * * * *